(12) United States Patent
Koistinen

(10) Patent No.: US 7,221,662 B2
(45) Date of Patent: May 22, 2007

(54) TONE DETECTION ELIMINATION

(75) Inventor: Tommi Koistinen, Espoo (FI)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 09/920,362

(22) Filed: Aug. 1, 2001

(65) Prior Publication Data

US 2002/0049860 A1 Apr. 25, 2002

Related U.S. Application Data

(63) Continuation of application No. PCT/EP99/00729, filed on Feb. 4, 1999.

(51) Int. Cl.
*H04J 3/12* (2006.01)
(52) U.S. Cl. ............... 370/328; 370/352; 370/465
(58) Field of Classification Search ........... 370/352, 370/354–356, 328, 338, 465–466
See application file for complete search history.

(56) References Cited

U.S. PATENT DOCUMENTS

| 5,983,117 | A | * | 11/1999 | Sandler et al. ............. 455/557 |
|---|---|---|---|---|
| 6,009,383 | A | * | 12/1999 | Mony ........................ 704/200 |
| 6,256,612 | B1 | * | 7/2001 | Vo et al. .................... 704/500 |
| 6,259,691 | B1 | * | 7/2001 | Naudus ...................... 370/352 |
| 6,298,055 | B1 | * | 10/2001 | Wildfeuer .................. 370/352 |
| 6,392,999 | B1 | * | 5/2002 | Liu et al. ................... 370/260 |
| 6,456,618 | B2 | * | 9/2002 | Kozdon et al. ............ 370/352 |
| 6,553,024 | B1 | * | 4/2003 | Hunlich et al. ............ 370/352 |
| 6,594,256 | B1 | * | 7/2003 | Koide ........................ 370/352 |
| 6,650,662 | B1 | * | 11/2003 | Arnaud et al. ............. 370/352 |
| 6,775,265 | B1 | * | 8/2004 | Oran .......................... 370/352 |
| 6,785,276 | B1 | * | 8/2004 | Valentine et al. .......... 370/391 |
| 6,856,612 | B1 | * | 2/2005 | Bjelland et al. ............ 370/338 |
| 6,868,080 | B1 | * | 3/2005 | Umansky et al. .......... 370/354 |

FOREIGN PATENT DOCUMENTS

| EP | 0332345 A | 9/1989 |
|---|---|---|
| EP | 0589619 A2 | 3/1994 |
| GB | 2290005 A | 12/1995 |
| WO | WO 97/50262 | 12/1997 |

OTHER PUBLICATIONS

International Search report for PCT/EP99/00729.

* cited by examiner

*Primary Examiner*—Zarni Muang
*Assistant Examiner*—Van Kim T. Nguyen
(74) *Attorney, Agent, or Firm*—Squire, Sanders & Dempsey L.L.P.

(57) ABSTRACT

The present invention discloses a communication system comprising a first communication device, a first network control device for controlling a first network to which the first communication device is connected, and a first interface establishing device connected between the first network control device and a transmitting network. The first communication device and the first network control device are connected such that a use signal and a control signal are sent separately to the first network control device. Furthermore, the first network control device and the first interface establishing device are connected such that the use signal and the control signal are sent separately to the first interface establishing device. In the communication system according to the invention, the need for a tone detection in the first interface establishing means, i.e. the gateway for the network, for example an IP-based network, is eliminated. Hence, a simplified hardware structure can be achieved and disturbances of the use signal by the control signal can be reduced.

18 Claims, 6 Drawing Sheets

TONE DETECTION ELIMINATION

This application is a continuation of international application serial number PCT/EP99/00729, filed 4 Feb. 1999.

FIELD OF THE INVENTION

The present invention relates to a communication system and method, in which a use signal is sent over a special transmitting network. In particular, the present invention relates to a communication system and method wherein a control signal and the use signal are sent over the network separately.

BACKGROUND OF THE INVENTION

In recent years, the Voice over IP (VoIP) technology was developed in which a phone call as an example of a use signal is sent via an IP-based network (IP network, internet protocol network) such as the Internet, for example. By sending the signal via such a network instead of a conventional long distance carrier, it is possible to reduce the costs involved for such a call.

A basic structure of a communication system using the above technology is shown in FIG. 1. For the purpose of the following description, the devices shown on the left side of the IP network (transmitting network) 4 in FIG. 1 is referred to as the near-end side, while the right side is referred to as the far-end side.

A mobile phone 1 as a first communication device is connected to a first network control device 2 for controlling a first network (near-end network) to which the mobile phone 1 is connected. The first network control device 2 is, for example, a mobile services switching center (MSC). A speech signal is sent, for example at a bit rate of, e.g., 64 kbps from the first network control device 1 to a first gateway 3 which connects the near-end network with the IP network 4. In order to achieve capacity saving on the IP link, the speech is compressed in the gateway.

This compression is performed by a codec (coder-decoder, transcoder, code converter) arranged in the first gateway 3. A typical compression ratio for speech is, for example, 8:1. Since the function of the codec itself is not important to the present invention, a detailed description thereof is omitted here.

The speech signal is compressed, for example, to a bit rate of 8 kbps. The compressed speech signal is sent via the IP network 4 to a second gateway 5. This second gateway also comprises a codec (coder-decoder). However, this codec 5a decompresses the compressed signal received from the IP network 4 to restore the original rate (i.e., in the above example, 64 kbps). The decompressed speech signal US is sent to a second network control device 6 for controlling a second network (far-end network) to which a phone 7 as a second communication device is connected. The second network control device 6 can be a mobile services switching center (MSC) in case the phone 7 is a mobile phone or a fixed services switching center (FSC) in case the phone 7 is a fixed phone. The second network control device 6 sends the signal to the destination phone 7.

As described above, the speech signal is compressed and decompressed. If also tone signals such as DTMF-tones (dual tone multi frequency) would be compressed and decompressed in the same way as the speech, these tones would be corrupted. The tones may sound sufficient to human ears but they are probably degraded out of specifications of tone-managed services.

Hence, usually a DTMF-tone detection is implemented in the gateways to bypass the codec.

Such a DTMF-tone detection is described hereinafter with reference to FIG. 2. In FIG. 2, the two gateways 3 and 5 of FIG. 1 are shown in more detail. For simplifying the description, the network, over which the signals are transmitted, is not shown.

The first gateway 3 comprises a codec 3a, a tone detection means 3b and a tone generation means 3c. Likewise, the second gateway 5 comprises a codec 5a, a tone detection means 5b and a tone generation means 5c.

Reference character TS denotes a DTMF tone signal. The DTMF tone signal TS is detected by the tone detection means 3b of the near-end gateway 3. For sending the tone to the far-end gateway 5, a signaling message CS (control signal) is used. This signaling message can have an appropriate format as defined in standards. In the far-end gateway 5, the signaling message CS is received by the tone generation means 5c, by means of which the DTMF tone signal TS is generated again and supplied to the speech signal line. During the tone transfer, the speech channel may be idle.

In the following, a description is given as to how DTMF-tones are generated by using mobile phones with respect to FIGS. 2 and 3.

In FIG. 3, reference character 1 denotes a mobile-phone. When a key of this mobile phone 1 is pressed, the signaling message CS is sent to the first network control device 2, in which the corresponding DTMF tone signal TS is generated by a tone generating means 2a. The tone signal TS is included into the speech signal which is denoted by reference character US (use signal). That is, by including the DTMF tone signal TS in the speech signal US, the speech signal US is affected by the DTMF tone signal TS.

The speech signal US is sent to the first gateway 3, in which the DTMF tone signal is detected and converted by the tone generation means 3b to a signaling message again, as shown in FIG. 2. Furthermore, the speech signal US is compressed in a codec 3a of the first gateway 3 shown in FIG. 2. The compressed speech signal is denoted with reference character USC (compressed use signal).

The compressed speech signal USC and the signaling message CS are sent via the IP network to the second gateway 5. There, the signaling message CS is used to generate the tone into the speech channel, as described with respect to FIG. 2. This signal is sent to the second network control device 6.

Hence, in this conventional communication system, the signaling message is converted into a tone signal and then again converted into a signaling message which causes the tone generating means 5c in the second gateway 5 to generate a corresponding tone. This results in the drawbacks of a large hardware requirement and of disturbances of the use signal which may include a TFO (tandem free operation) stream in case of a mobile-to-mobile call.

In the following, the TFO (tandem free operation) is described in more detail. Usually in a mobile-to-mobile call the speech is encoded in the first mobile phone 1 to 8 kbps and then decoded in a codec (transcoder, code converter) before the network control device (for example, MSC) back to 64 kbps. In the first network control device 2, the 64 kbps call is turned back and it is encoded again in a codec to 8 kbps. This signal is sent to the receiving side and decoded in the same manner in the other mobile phone back to 64 kbps.

The tandem free operation (TFO) makes it possible to omit the unnecessary decoding/encoding phases in codecs. For compatibility of network control devices being capable of performing the TFO and network control devices not being able to perform the TFO, both formats (8 and 64 kbps) are sent from the transcoder towards the MSC, wherein the encoded parameters are inserted in the least significant bits of a 64 kbps stream. This insertion degrades the quality of the 64 kbps stream only to a small extent.

However, in such a case, the tone generation in the first network control device 2 as described above corrupts the TFO stream inside the 64 kbps stream, such that the TFO stream synchronisation can get lost.

Document WO-A-97 50262 dislcoses a communication system and method as defined in the preambles of claims 1 and 23. A use signal and a control signal are transmitted separately via a part of the communication path.

Document EP-A-0 589 619 discloses an architecture for a wireless telecommunication system in which voice channels and data links are provided separately between a multiplexer connected to a private branch exchange (PBX) and a cell site.

SUMMARY OF THE INVENTION

Thus, the object underlying this invention resides in providing a communication system and method in which the drawbacks of the above prior art are removed.

This object is solved by a communication system and by a communication method recited in the pending claims.

Hence, in the communication system and method according to the present invention, there is no need for tone detection in the gateway i.e. the first interface establishing means. Thus, an improved performance is achieved, since no tone detection processing is necessary. Furthermore, the hardware can be simplified, since no circuits for this processing is required, and memory capacities can be reduced. Thus, no tone generation is performed on the near-end side but only on the far-end side.

Moreover, no tandem tone generation occurs. That is, no multiple conversion of the tone as a signaling message to a tone generated into the use signal and vice versa is required. Hence, errors due to the conversions can be reduced.

Moreover, in the communication system and method according to the present invention, the speech stream (the use signal) and the signaling stream (control signal) are separated. Thus, the use signal is not affected by the control signal during communication.

For example, during a phone call with an automatic information service, keys have to be pressed which causes DTMF tones to appear during the communication. In the communication system and method according to the present invention, the DTMF tones are generated and added to the speech signal only on the far-end side. Hence, the speech stream is less disrupted when DTMF tones are present during a call.

Furthermore, there are four speech codecs in the connection. The first codec is in the radio interface, i.e. the network control device (e.g., MSC). The second and third codes are in the gateways. The fourth codec is in the last radio interface, i.e. the second network control device. Thus, in case of a mobile-to-mobile call and TFO capable network control devices as described above, the TFO stream (e.g. at 8 kbps) within the use stream (e.g. at 64 kbps) is not corrupted during the transmission. The DTMF tones are generated in the use signal only at the receiving side behind the codec of the second gateway. Therefore, only the codec in the network control device on the receiving side looses its TFO synchronization whereas according to the prior art, already in the first network control device, the DTMF tone is generated into the use signal such that already the second codec looses its synchronisation, that is, three out of four codecs loose their synchronisation. Thus, in case of a tandem free operation, a more reliable communication with a higher quality is possible.

Further advantageous developments of the present invention are stated in the enclosed dependent claims.

BRIEF DESCRIPTION OF THE DRAWINGS

The present invention will be more readily understood with reference to the accompanying drawings in which.

DETAILED DESCRIPTION OF PREFERRED EMBODIMENTS

Figure 4:
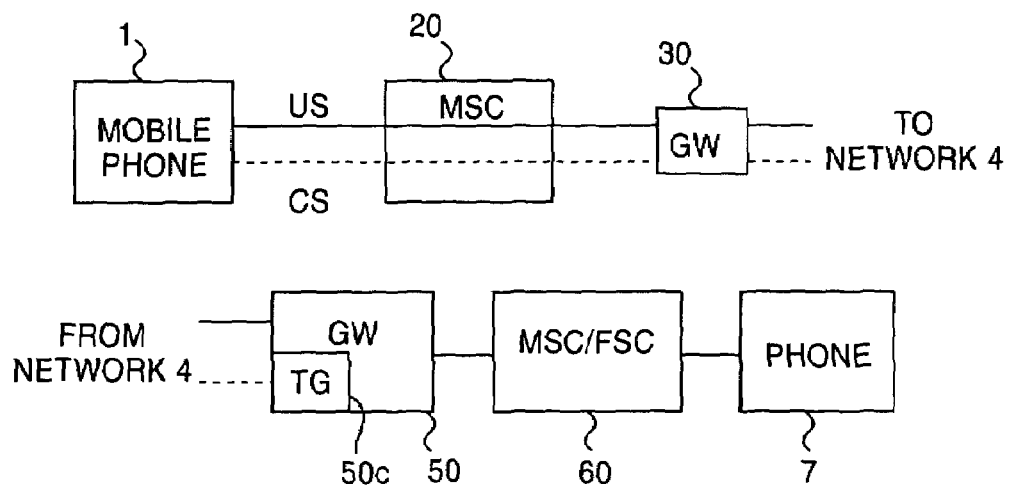
FIG. 4 shows an arrangement of a communication system on the near-end side and the far-end side according to a first embodiment.
Figure 5:
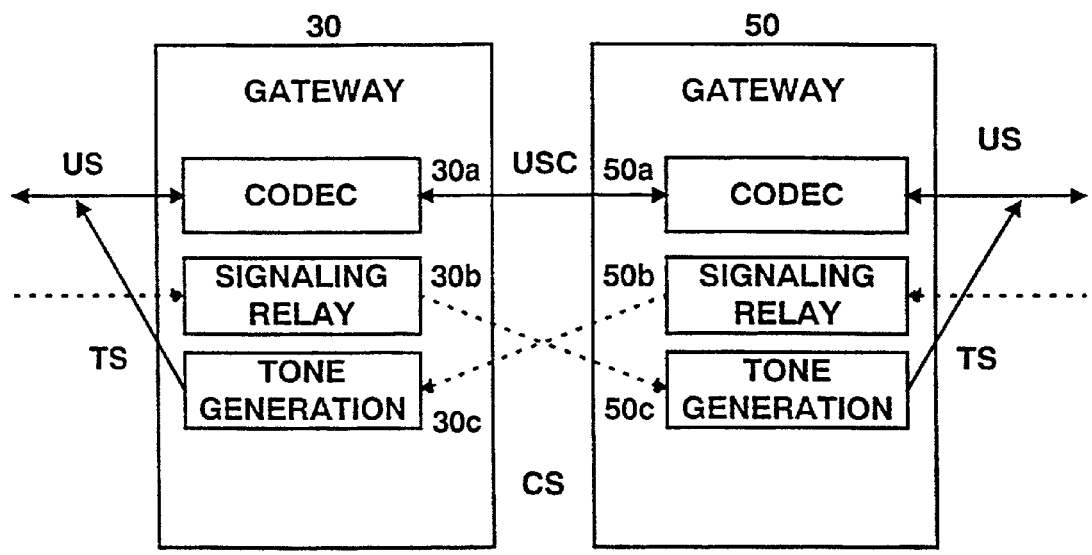
FIG. 5 illustrates the tone handling in the gateways according to the first embodiment.

In the following, a first embodiment of the invention is described with reference to FIG. 4 and 5. In FIG. 4, the near-end side of the communication system according to the first embodiment is shown in the upper half, whereas the far-end side is shown in the lower half. In FIG. 5, a first gateway 30 and a second gateway 50 are shown in more detail, wherein the transmitting network is not shown in order to simplify the description.

Figure 1:
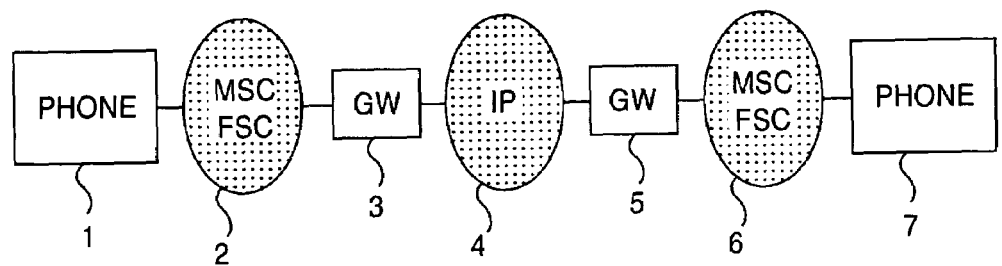
FIG. 1 shows the basic structure of a communication system communication via IP.
Figure 2:
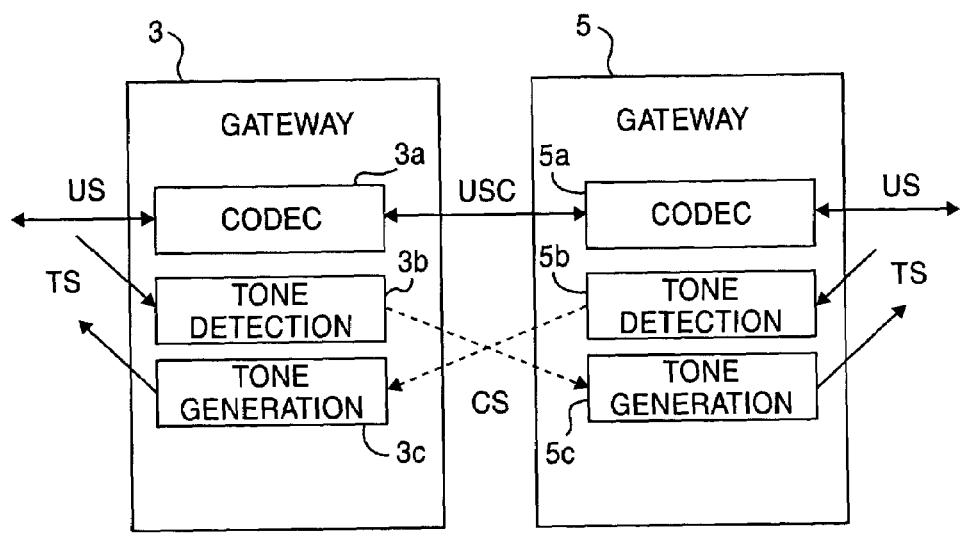
FIG. 2 shows DTMF-handling in gateways in the prior art.
Figure 3:
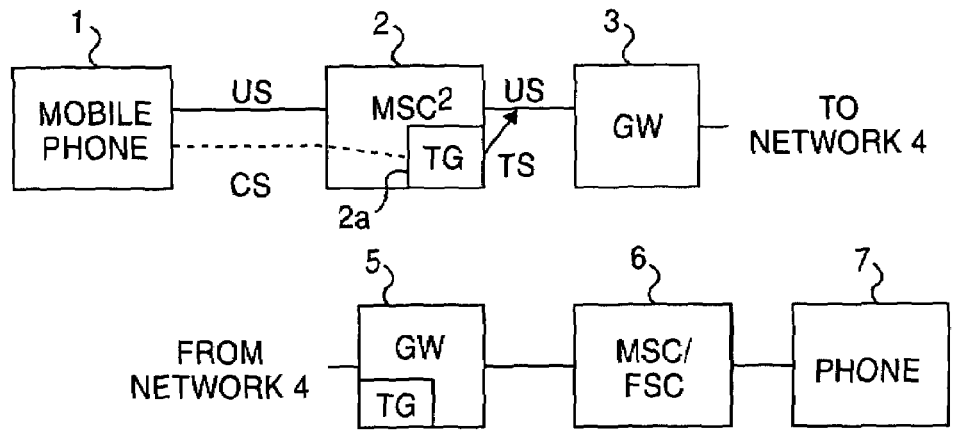
FIG. 3 shows an arrangement of the communication system on the near-end side and the far-end side according to the prior art.

The basic structure of the communication system according to the first embodiment is in general the same as that described with respect to FIG. 1. That is, a mobile phone 1 as an example for a first communication device is connected to a first network control device 20, which controls a first network (near-end network) to which the mobile phone 1 is connected.

Reference character CS denotes a signaling message as an example for a control signal and reference character US denotes a speech signal as an example for a use signal. In the mobile phone 1, the signaling message CS is generated in response to the operation of a key, for example. The mobile phone 1 outputs this signaling message CS and the speech signal US separately.

The first network control device 20 is connected to the first gateway 30 as an example for a first interface establishing means. The first gateway 30 is connected via an IP based network 4 as an example for a transmitting network to a second gateway 50 as an example for a second interface establishing means on the far-end side. A second network control device 60 for controlling a second network to which a phone 7 as an example for a second communication device is connected, is connected to the second gateway 50. The phone 7 is connected to the second network control device 60.

The second network control device 60 can be a mobile services switching center (MSC) in case the phone 7 is a mobile phone or a fixed services switching center (FSC) in case the phone 7 is a fixed phone. The phone 7 can be the same type as the phone 1. However, it is not limited thereon.

In the first network control device 20 according to the first embodiment, the tone generating means is omitted. Instead, the signaling message CS is sent directly to the first gateway 30 without being added to the speech signal US. As an alternative, the format of the signaling message CS can be varied in the first network control device 2, if necessary.

The first gateway 30 on the near-end side comprises a codec (coder-decoder, transcoder, code converter) 30a and a signaling relay means (control signal transfer means) 30b. The codec 30a receives the speech signal US, which has, for example, a bit rate of 64 kbps, and compresses the speech signal US to a bit rate as necessary for the IP network 4 (transmitting network). Reference numeral USC denotes the compressed speech signal as an example for the compressed use signal, which has a bit rate of, e.g., 8 kbps. The signaling relay means 30b receives the signaling message CS from the first network control device 20 and sends the signaling message CS to the network 4. Again, as an alternative, the format of the signaling message CS can be varied in the first gateway 30, if necessary.

That is, the signaling message CS is directly sent from the mobile phone 1 to the first gateway 30 without being converted to a tone signal such as a DTMF (dual tone multi frequency) tone signal. Thus, according to the first embodiment, the tone detection in the first gateway necessary in the prior art is omitted.

On the far-end side, the second gateway 50 connected to the IP network 4 comprises a codec 50a and a tone generating means 50c. The codec 50a decompresses the received compressed speech signal USC as necessary for the second network on the far-end side. The tone generating means 50c receives the signaling message CS from the near-end side and generates in response to the signaling message a tone signal TS. According to the present embodiment, the tone signal TS is a DTMF signal, however, it is not limited thereon. The tone signal TS is then combined with the speech signal.

The combined signal is sent to the second network control device 60 which sends the combined signal to the phone 7. According to the first embodiment, the combined signal is sent to the phone 7 as in the prior art. Thus, a detailed description thereof is omitted.

The gateways 30 and 50 shown in FIG. 5 allow communicating in both directions. That is, also the second gateway 50 comprises a signaling relay means 50b which sends a signaling message CS generated on the far-end side to the near-end side similar to the signaling relay means 30b on the far-end side. Furthermore, the first gateway 30 comprises a tone generating means 30c generates a tone signal TS in response to a signal message CS received from the signaling relay means 50b on the far-end side. Since the functions of these devices with respect to the other direction are similar to those described above, a detailed description thereof is omitted.

Figure 6:
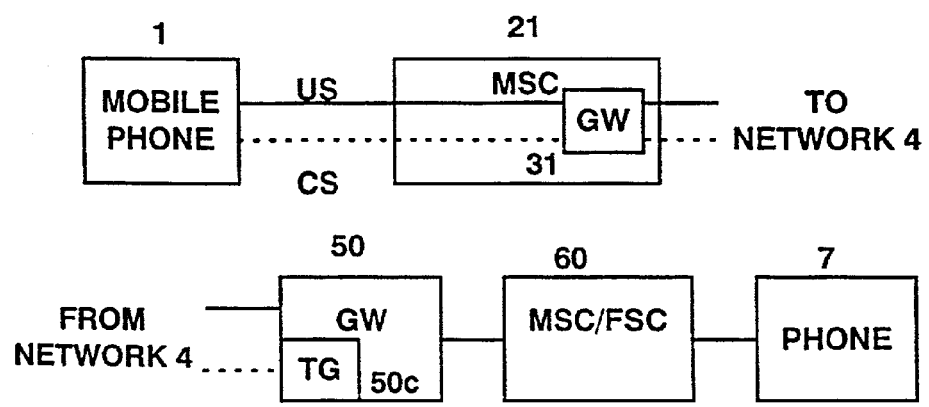
FIG. 6 shows an arrangement of a communication system on the near-end side and the far-end side according to a modification of the first embodiment.

In the above description of the first embodiment with reference to FIG. 4, the network control device 20 and the gateway 30 are arranged as separate units. However, it is also possible to arrange the gateway in the network control device such that both devices form a unit. This modification of the first embodiment is shown in FIG. 6, in which the first network control device 21 comprises the gateway 31.

A similar modification is also possible on the far-end side. That is, the second gateway and the second network control device can also be arranged as one unit.

Figure 7:
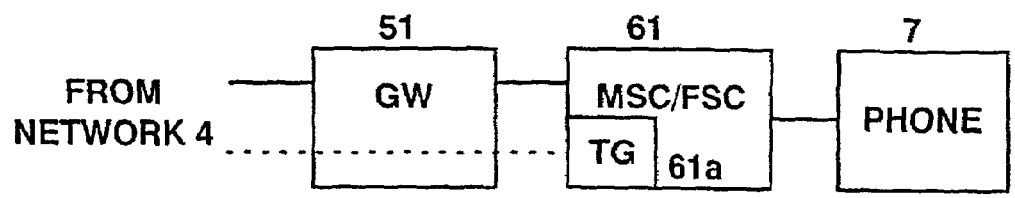
FIG. 7 shows an arrangement of a communication system on the near-end side according to a second embodiment of the invention.

Next, a second embodiment is described with reference to FIG. 7. The structure according to the second embodiment is basically the same as according to the first embodiment. However, the second gateway and the second network control device differ from that according to the first embodiment.

In detail, the second gateway 51 does not comprise a tone generating means. Instead, the signaling message CS received from the near-end side is sent by the second gateway 51 directly to the second network control device 61. Thus, the signaling message CS and the speech signal US are sent separately to the second network control device 61. As on the near-end side, the format of the signaling message CS can be changed in the gateway 51, if necessary.

The network control device 61 comprises a tone generating means 61a. This tone generating means 61a generates a tone signal TS in response to the signaling message CS received from the second gateway 51. The speech signal US and the tone signal TS are combined, and the combined signal is sent to the phone 7. According to the second embodiment, the combined signal is sent to the phone 7 as in the prior art. Thus, a detailed description thereof is omitted.

Figure 8:
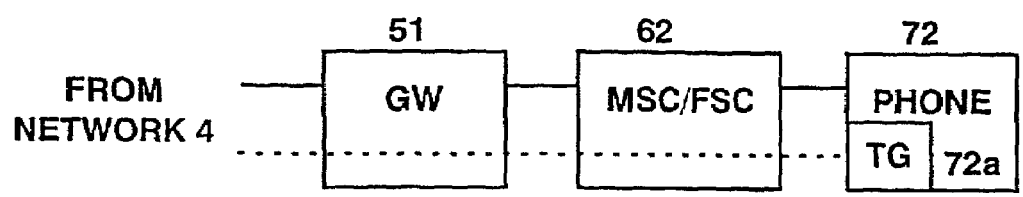
FIG. 8 shows an arrangement of a communication system on the near-end side according to a third embodiment of the invention.

Hereinafter, a third embodiment is described with respect to FIG. 8. The structure according to the third embodiment is basically the same as according to the second embodiment. However, the second network device and the second communication means (phone) differ from that according to the first embodiment.

In detail, the second network device 62 does not comprise a tone generating means. Instead, the signaling message CS is sent directly to the phone 72. Thus, the signaling message CS and the speech signal US are sent separately to the phone 72.

The format of the signaling message CS can be changed in the second network device.

The phone 72 comprises a tone generating means 72a. This tone generating means 72a generates a tone in response to the signaling message CS received from the second network control device 62.

Figure 9:
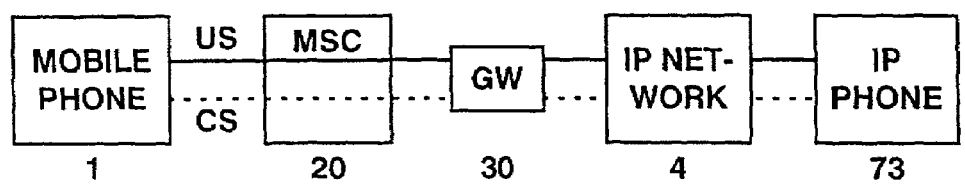
FIG. 9 shows an arrangement of a communication system to a fourth embodiment of the invention.

In the following, a fourth embodiment of the invention is described with reference to FIG. 9. The near-end side is constructed as the near-end side shown in FIG. 4, whereas on the far-end side an IP phone 73 is directly connected to the IP network 4. In this case, no gateway and no network control device is necessary. The signaling message is supplied to the IP phone, where it is processed or converted into a DTMF tone signal as required.

Figure 10:
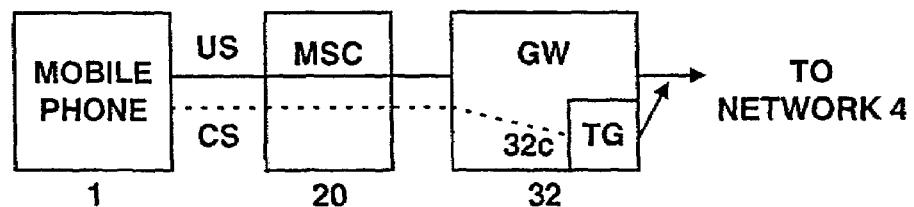
FIG. 10 shows an arrangement of a communication system on the near-end side to a fifth embodiment of the invention.

Next, a fifth embodiment of the invention is described with respect to FIG. 10. This embodiment is applicable, for example, in a case where on the far-side a conventional gateway is connected which cannot receive the signaling message such that the tone signal and the speech signal have to be transmitted over the network 4. In this case, the invention can be applied such that at least the codec in the first network controller MSC can be bypassed.

As shown in FIG. 10, the mobile phone 1 sends separately the speech signal US and the signaling message CS to the first network control device MSC 20, which supplies both signals separately to the gateway 32. This gateway comprises a tone generator TG 32c, which generates corresponding DTMF tones into the speech signal USC which is transmitted over the network 4.

Hence, the present invention can also applied to cases in which a conventional system is used on the far-end side.

Figure 11:
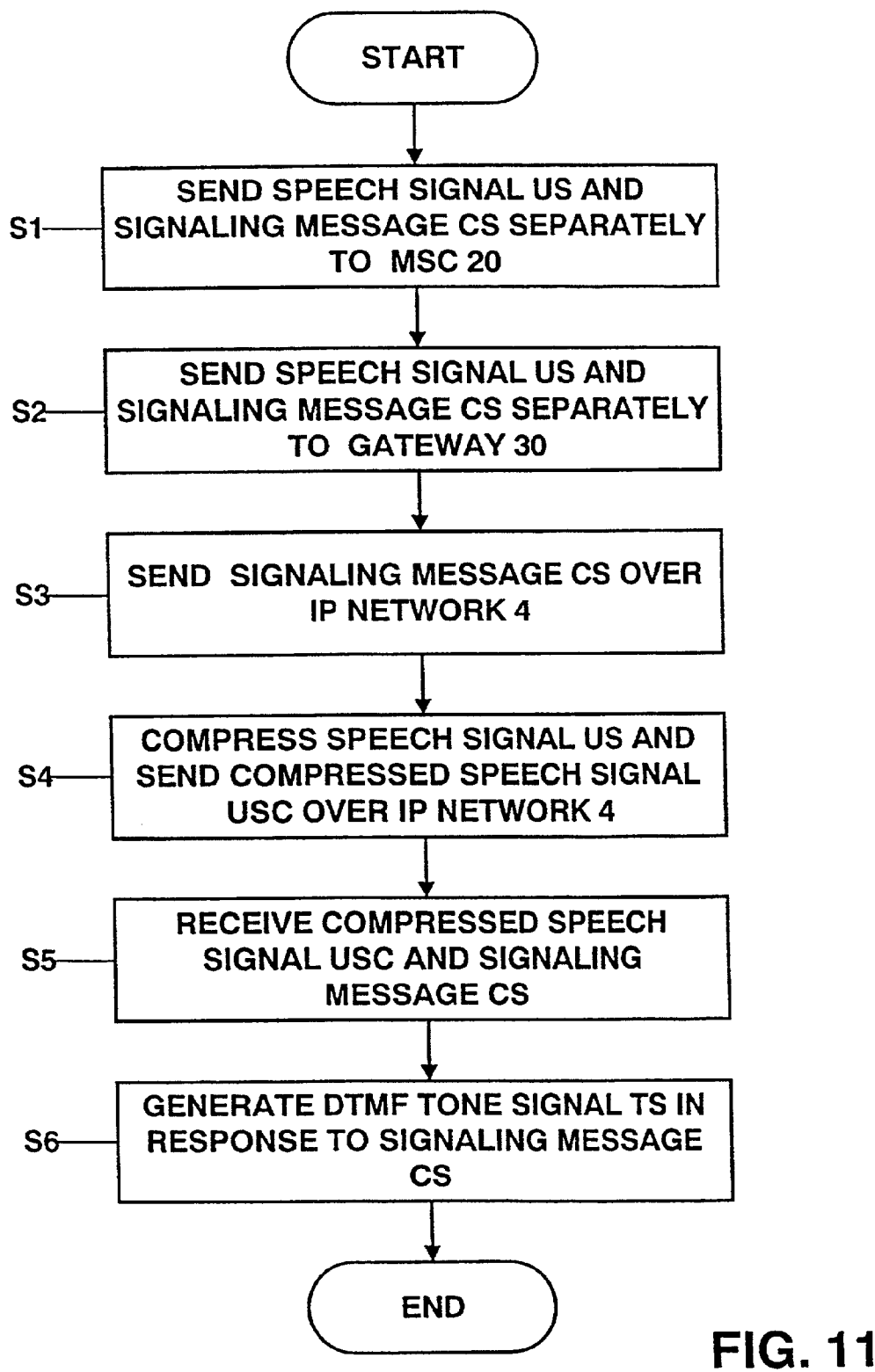
FIG. 11 shows a flowchart of the communication method according to the embodiments of the invention.

With reference to a flowchart shown in FIG. 11, the communication method which is carried out in general according to the above embodiments is described.

In step S1, the speech signal US and the signaling message CS are separately sent from the phone 1 to the first network control device 20. In step S2, the speech signal US and the signaling message CS are sent separately from the first network control device 20 to the first gateway 30.

By these two steps, it is already prevented to subject the tone signal to a compression in a codec in the first network control device 20. Furthermore, a tone detection in the gateway necessary in the prior art is eliminated. It is to be noted that according to the fifth embodiment, only these two steps are performed.

According to the first to fourth embodiments, the following steps are also carried out. That is, in step S3, the signaling message CS is sent from the first gateway 30 over the IP network 4 without any processing. In contrast thereto, in step S4 the speech signal US is compressed and the compressed speech signal USC is sent over the IP network 4. For example, the speech signal US can have a bit rate of 64 kbps and the compressed speech signal can have a bit rate of 8 kbps.

In step S5, the compressed speech signal USC and the signaling message CS is received by the second gateway 50. Then, in response to the signaling message CS, the DTMF tone signal is generated in step S6. The generation of the DTMF tone signal can be effected either in the second gateway 50, the second network control device 61 or the second communication device 72.

Thus, in the communication system according to the above described embodiments, the need for a tone detection in the first interface establishing means, i.e. the gateway for the transmitting network such as an IP-based network, is eliminated. Hence, a simplified hardware structure can be achieved and disturbances of the use signal, i.e., the speech signal, by the control signal, i.e., the DTMF tone signal, can be reduced.

According to the above described embodiments, the speech channel can be kept open between gateways, so that the speech stream (TFO stream) if used can go through the first gateway 20 without disruptions even when DTMF tones are present.

According to the above embodiments, the first communication means 1 has been described as a mobile phone, in which the speech signal and the signaling message are generated separately. However, also a fixed phone can be used for this communication means 1, in case that in this fixed phone sends DTMF tones as signaling as in case of a mobile phone. Furthermore, the second communication means has been described as a mobile phone or a fixed phone. However, it is obvious that other kinds of communication means can be used, for example, facsimile apparatuses or telephone answering apparatuses.

Moreover, the transmitting network 4 was described as an IP network. However, it should be understood that also another network over which the communication is effected can be used.

The above description and accompanying drawings only illustrate the present invention by way of example. Thus, the embodiments of the invention may vary within the scope of the attached claims.

The invention claimed is:

1. A communications system comprising:
    a first interface establishing device connected between the first network control device and a transmitting network; wherein
    a first communication device and said first network control device are connected such that a use signal and a control signal are sent separately to said first network control device;
    said first network control device and said first interface establishing device are connected such that said use signal and said control signal are sent separately to said first interface establishing device,
    said first interface establishing device is configured to send said control signal over said transmitting network and comprises a compressing unit configured to compress said use signal, the compressed signal being sent over said transmitting network; and
    a tone generation unit is provided on the far-end side of the network configured to receive said control signal after transmission through said transmitting network and to generate a tone signal in response to said control signal wherein
    a second interface establishing device connected to said transmitting network; and
    a second network control device; wherein
    said second interface established device comprises
    a decompressing unit configured to decompress said use signal received via said transmitting network;
    a control transfer unit configured to receive said control signal and sending said control signal to said second network control device; and
    a second communication device,
    wherein said second interface establishing device is configured to send said use signal to said second network control device, and
    said second network control device is configured to send said control signal and said use signal separately to said second communication device.

2. A communication system according to claim 1, wherein said second communication device comprises said tone generation unit.

3. A communication system according to claim 1, wherein said tone signal generated in response to said control signal is a DTMF signal.

4. A communication system according to claim 1, wherein said first communication device is further configured to generate said control signal in response to an operation of a key.

5. A communication system according to claim 1, wherein said transmitting network is an IP based network.

6. A communication system according to claim 1, wherein said first communication device is a mobile phone.

7. A communication system according to claim 1, wherein said first communication device is a fixed phone.

8. A communication system according to claim 1, wherein said second communication device is a mobile phone.

9. A communication system according to claim 1, wherein said second communication device is a fixed phone.

10. A communication system according to claim 1, wherein said first network control device and said first interface establishing device are constructed as one unit.

11. A communication system according to claim 1, wherein
said first network control device and said first interface establishing device are constructed as separate units.

12. A communication system according to claim 1, wherein
said second network control device and said first interface establishing device are constructed as one unit.

13. A communication system according to claim 1, wherein said first network control device and said first interface establishing device are constructed as separate units.

14. A communication system according to claim 1, further comprising a network communication device connectable directly to said transmitting network such that said control signal and said use signal is transmitted from said first interface establishing device to said network communication device.

15. A communication system according to claim 14, wherein said transmitting network is and IP based network and said network communication device is an IP phone.

16. A communication method for a communication system said method comprising:
sending a use signal and a control signal from said first communication device to said first network control device separately;
sending said use signal and said control signal from said first network control device to said first interface establishing device separately;
receiving said control signal from said first network control device and sending said control signal over said transmitting network; and
receiving said control signal after transmission through said transmitting network by a tone generation units provided on the fair-end side of the network;
and generating a tone signal in response to said control signal,
wherein the communication system includes a first communication device, a first network control device configured to control a first network to which said first communication device is connected, and a first interface establishing device connected between said first network control device and a transmitting network,
wherein said generating said tone signal is performed in a second communication device.

17. A method according to claim 16, further comprising of compressing said use signal, the compressed signal being sent over said transmitting network.

18. A method according to claim 17, further comprising receiving said compressed use signal and said control signal in a communication system on a far-end side of said transmitting network.

* * * * *